United States Patent [19]
McDonald et al.

[11] Patent Number: 5,881,268
[45] Date of Patent: Mar. 9, 1999

[54] COMPARATIVE PERFORMANCE MODELING FOR DISTRIBUTED OBJECT ORIENTED APPLICATIONS

[75] Inventors: Richard Denison McDonald, Scarborough; Anita Krista Rass, Willowdale; Bin Qin, Pickering; Brighid Anne Thompson, East York, all of Canada

[73] Assignee: International Business Machines Corporation, Armonk, N.Y.

[21] Appl. No.: 723,180

[22] Filed: Sep. 30, 1996

[30] Foreign Application Priority Data

Mar. 14, 1996 [CA] Canada ................................. 2171802

[51] Int. Cl.⁶ ................................................. G06F 9/455
[52] U.S. Cl. ................................................. 395/500
[58] Field of Search .......................... 395/500, 183.07, 395/800.28; 701/103; 379/201

[56] References Cited

U.S. PATENT DOCUMENTS 5,398,336  3/1995  Tantry et al. ........................... 701/103
5,652,789  7/1997  Miner et al. ............................ 379/201

*Primary Examiner*—Kevin J. Teska
*Assistant Examiner*—Dan Fiul
*Attorney, Agent, or Firm*—David A. Mims, Jr.

[57] ABSTRACT

A performance modeling tool and method permitting the user to define the elements of a distributed system (hosts, networks and response times), and examine the effect on performance of different distributions of application processes over the system at an early stage in application design. Once a user has defined a performance scenario, it is saved to a data model as a number of interdependent persistent objects that show the distribution of the application for a particular performance scenario from different views. Multiple alternates of each object can be stored. The user can construct different performance scenarios for analysis from the stored objects. Analysis can include performance simulation from which the user can obtain performance projections for an application process or several application processes over different distributions of the performance workload.

21 Claims, 12 Drawing Sheets

COMPARATIVE PERFORMANCE MODELING FOR DISTRIBUTED OBJECT ORIENTED APPLICATIONS

FIELD OF THE INVENTION

This invention relates generally to the area of application design, and is particularly directed to a tool that simplifies performance specification for performance modeling and analysis.

BACKGROUND OF THE INVENTION

In distributed and multi-processor systems, multiple hardware servers and their resident software are linked, and cooperate in providing the resources required to execute the software processes of the system. In such systems, software processes can act as both clients and software servers while sharing the hardware resources. Typical examples of distributed systems include transaction processing systems and data acquisition systems.

In distributed systems of this type, there is a likelihood that there will be delays in execution as processes contend for the hardware and software resources. The system performance behavior is not readily predictable; changes in requests for service between processes, the number of instances of processes, the internal level of concurrency within processes and the placement of processes on processors are all factors that can have a significant impact on system performance.

Performance modeling is an analysis method for discovering which of a system's many features constrain performance by representing them in a predictive model. The resource demands of each process in the system, such as processor time requirements and requests for services from other processes, are quantified and used to define a model. The performance measures that are predicted are a super set of those for closed queuing network models and include:

1. process throughput and response times;
2. process utilizations, and the average number of processes queued at each serving process;
3. device utilizations, and average queue lengths.

A change in model parameters permits the prediction of system performance under modified circumstances. Using such a model, a range of system scenarios can be examined without actually altering the system under study.

"The Method of Layers" (Rolia, J. A. and Sevcik, K. C., *IEEE Transactions on Software Engineering*. Vol. 21, No. 8, pp. 689–700, Aug. 1995) is one model for obtaining performance estimates for distributed systems. In the method of layers approach, estimates of performance for queuing in a closed network, average number of visits for individual software process types and scheduling disciplines are used as input parameters for models (called layered queuing models or LQM) of the components of a distributed system. The method of layers divides an LQM into two complementary models, one for software and one for devices, and combines the results to provide performance estimates for the system under study.

One model, called the software contention model, describes the relationships in the software process architecture and is used to predict software contention delays.

The second model, called the device contention model, is used to determine queuing delays at hardware devices. By alternating between the software and device contention submodels, differences in non-serving group response time estimates can be narrowed, and at the point that these differences are less than some tolerance, the performance metrics for the LQM have reached a fixed point so that a predictable model is achieved.

While there are computer tools to assist users in designing programs to improve standards, these are mainly of the computer aided software engineering (CASE) type, rather than performance analysis tools utilizing analysis methods such as the methods of layers.

For example, U.S. Pat. No. 5,187,788 of the United States of America as represented by the Secretary of the Air Force, titled Graphics System for Automatic Computer Code Generation, describes an automatic code generation tool for the Ada programming language, a semi-object oriented language, within a unitary processing environment. From an initial program design, three different visual representations of this program are generated; an overview of the program components, a representation of the data structures and local variables, and a representation of the flow control of the program. As the programmer changes aspects of the program in any of these views, consistency is maintained in the other representations.

U.S. Pat. No. 5,295,222 of Seer Technologies, Inc., titled Computer-Aided Software Engineering Facility, describes a case facility for creating distributed applications. While the system described may itself be object oriented, the patent describes the input applications in terms of entities and relationships which is not an object oriented approach to application design. The described facility utilizes a relational database to store information on all application programs created using the facility. The contents of this database can be reused, as needed, in subsequent applications. This facility also provides the user with multiple consistent views of a single application to aid in distributed design. Following application design and code generation, a debugging and testing facility enables users to evaluate the performance of the generated application.

Finally, U.S. Pat. No. 5,394,522 of the present applicant, titled Selecting and Locating Graphical Icon Objects to Define and Configure the Workstations in Data Processing Networks is directed to a tool for configuring communication and database networks having a graphical user interface to visually represent the elements of the network. Files with configuration parameters are associated with each iconic representation, and these files can be deployed or modified by a central network manager. The facility can easily be switched between a communication and a database mode of operation.

While the tools described in these patents may assist in program design and deployment of program modules or objects over distributed networks, none of the foregoing assists the user to design an optimal distributed program based on performance characteristics of a selected network. The programmer may select different distributed configurations for the program in order to test performance at a practical level, but is not provided with any means for an up-front analytical performance comparison of different models prior to code generation.

It is therefore an object of the present invention to provide application developers with a tool that can automatically transform a performance analysis model, such as the method of layers, into a tool for comparing various design alternatives.

Another object of the invention is to provide a performance analysis tool to be used at the earliest stages of application design for the client server environment, to determine an optimal distribution of objects prior to writing or generating the program code.

A further object of the invention is to provide a mechanism for application developers to view and understand performance specifications from different angles.

Other objects of the present invention will become obvious from reviewing the disclosure and claims.

Accordingly, the present invention provides a mechanism for providing performance projections for designs of an application over a distributed system. The mechanism includes means for defining different parameters of the application and the distributed system means for storing the defined parameters as persistent objects means for modifying the stored persistent objects and means for providing analyses of selected groupings of the stored persistent objects that define different performance scenarios.

Preferably, in the means for defining different parameters of the application and the distributed system, a graphical user interface is provided adapted to receive input from a user and schematically display distributed objects and networks from the distributed system, and interaction links between the distributed objects from the application, and preferably the means for storing the defined parameters as persistent objects include means to store as separate objects alternate distributions of the distributed objects and alternate interaction links between the distributed objects.

The invention also provides a method for determining a performance-based distribution of application processes over a distributed system having a plurality of linked processors and including middleware connections between distributed processors. The method includes the steps of:

i) selecting parameters defining
   a) hosts, networks and connections in the distributed system, and
   b) interactions between the hosts for executing at least one application process;
ii) executing a simulation of said at least one application process according to the selected parameters; and
iii) providing a performance analysis of the simulation.

A computer program product having computer readable code means embodied in a computer usable media for effecting the above is also provided by the invention.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Figure 1:
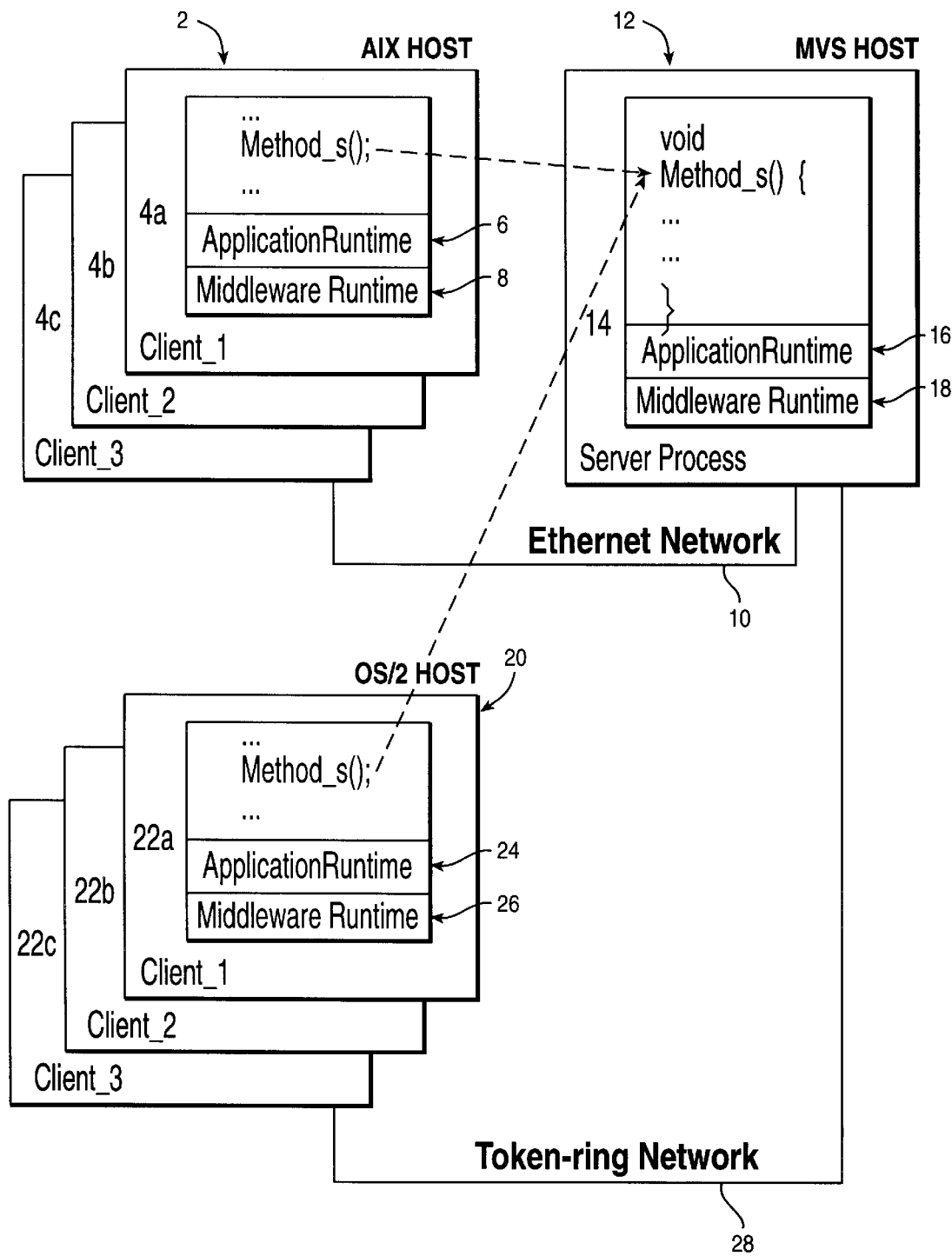
FIG. 1 is a schematic representation of a typical target distributed system.

FIG. 1 illustrates a typical distributed system with mixed hardware and platform "host" systems interconnected over different types of hardware. In the example illustrated, an AIX® host 2 ( an IBM® AIX operating system residing on an RS/6000® computer) includes multiple client applications 4a, 4b and 4c, an application runtime 6 for the operating system and a middleware runtime 8 for communicating distributed calls. The AIX host 2 is linked through an Ethernet network 10 to a mainframe computer or MVS host server 12 which acts solely as a server. To this end, the MVS host 12 has resident server process software 14, a runtime for the operating system 16 and a middleware runtime 18 for dealing with and responding to incoming distributed communications. An OS/2® host 20 (a personal computer, such as an IBM PS/2® system with an IBM OS/2 operating system) is also provided with multiple client applications 22a, 22b, and 22c, an application runtime 24 and a middleware runtime 26. The OS/2 host 22 is linked to the MVS host/server through token ring network 28.

The three component systems of the distributed system shown in FIG. 1 and discussed above all have quite different performance characteristics, and these performance characteristic may be affected by the capabilities of the two different types of networks over which the systems communicate. Intuitive decision-making for optimal distributed configuration of an application in advance of writing the code and "trying it out" is not possible because of the number of factors that could affect performance. It is this type of design situation to which the tool and method of the present invention are ideally suited.

In its preferred embodiment, the performance modeling tool of the present invention consists of a graphical user interface, an internal data model and a performance modeling and analysis engine.

Figure 2:
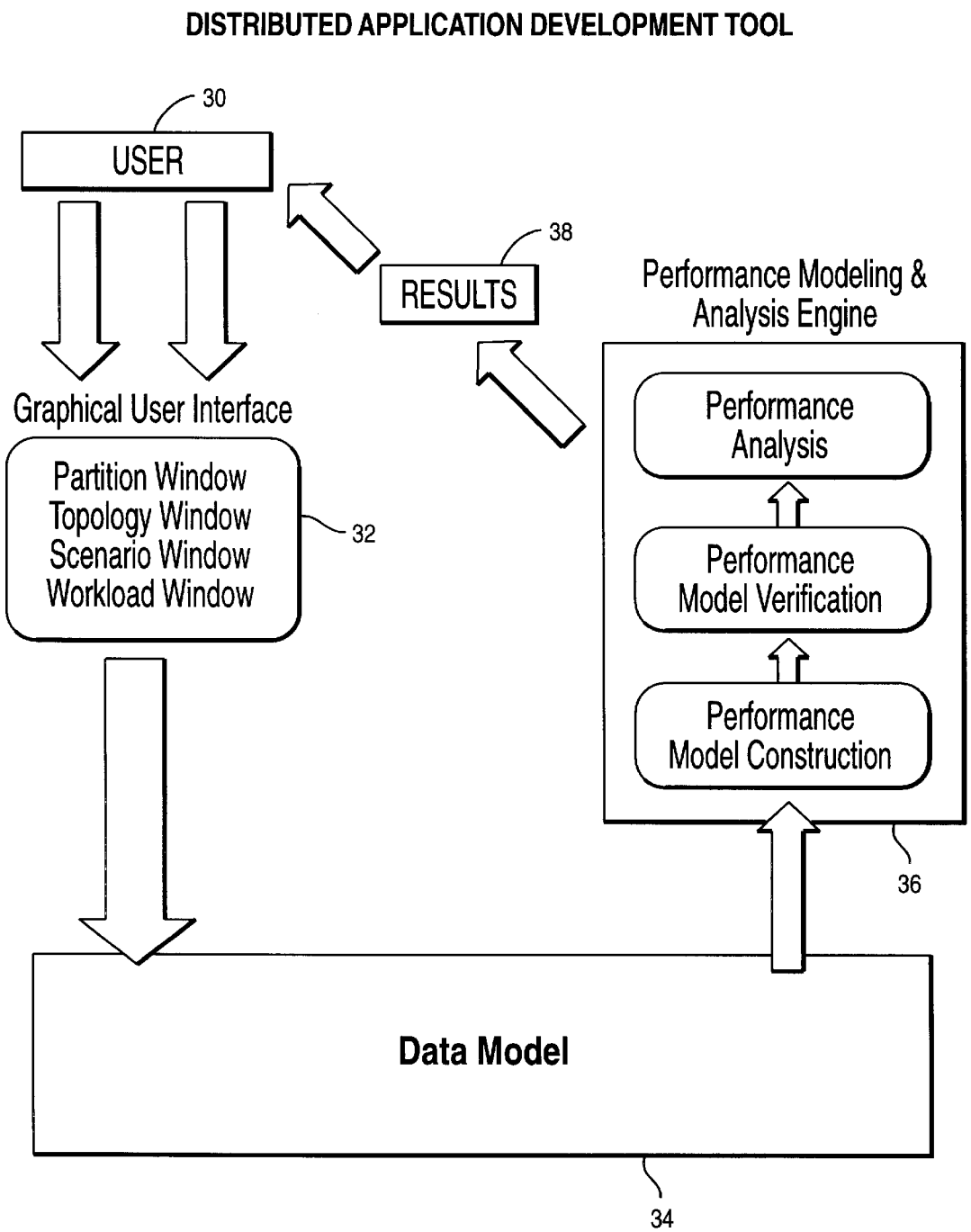
FIG. 2 is a schematic representation of the interaction between the elements of the preferred embodiment of the invention and the user.
Figure 3:
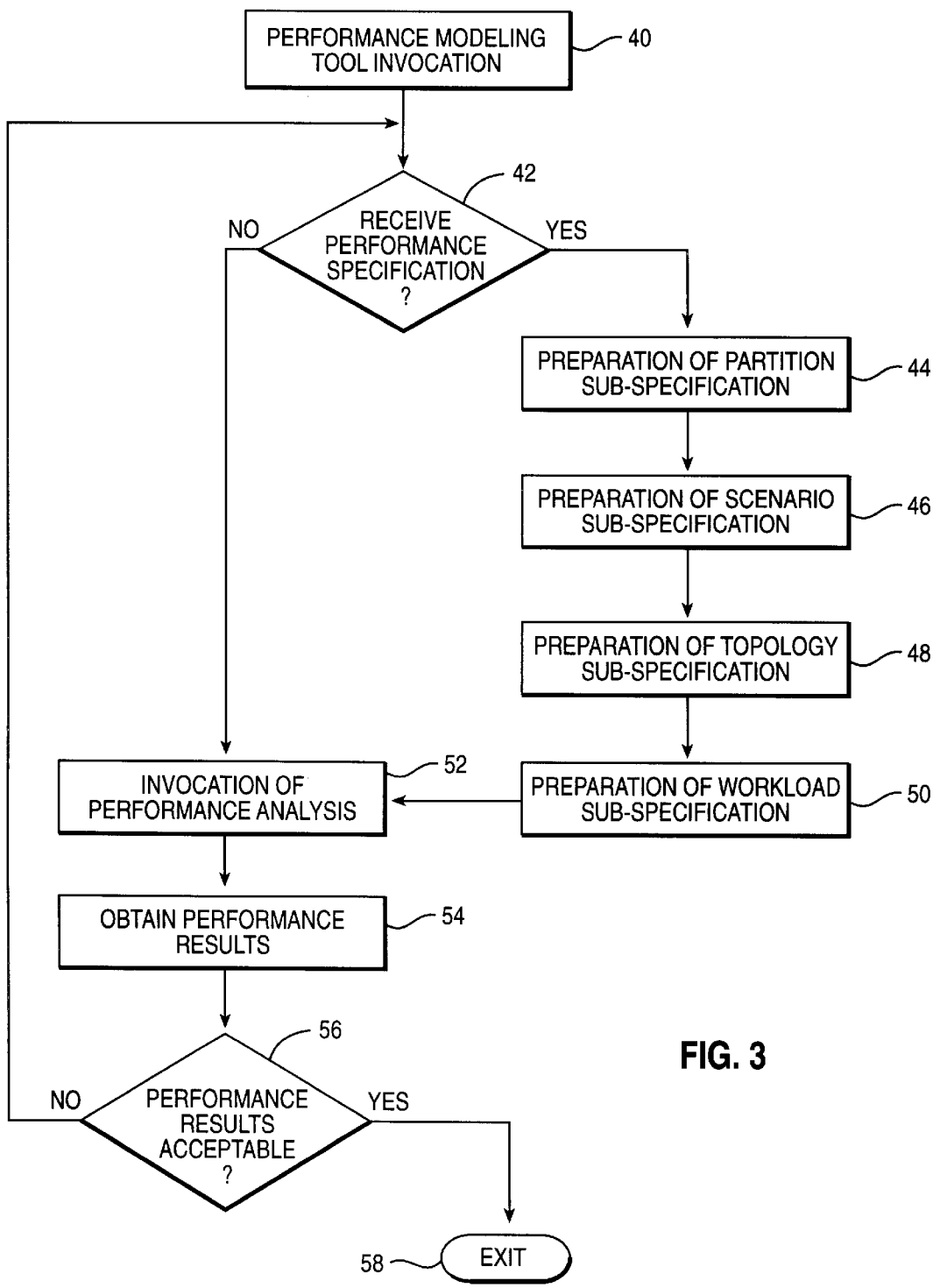
FIG. 3 is a flow diagram illustrating the general operating steps of the performance modeling tool, according to the invention.

An overview of the operation of a performance modeling tool is illustrated schematically in FIGS. 2 and 3. Referring first to the flow diagram of FIG. 3, the user causes the performance modeling tool to be invoked (block 40). As shown in FIG. 2, the manner in which the user 30 communicates with the performance modeling tool is through the tool's graphical user interface (GUI) 32 that allows the user to make entries to specify hardware configuration, software component interaction, input characteristics and software placement, the performance specifications of the application and target distributed system (block 42, FIG. 3). In the preferred embodiment of the invention, four views or windows are provided; an partition view, a scenario view, a topology view and a workload view. The internal structure of an application is specified through the partition window and scenario window; the input to the application is specified through the workload window; and the hardware configuration for the application's execution is specified through the topology window. If performance specifications are entered into the tool, these are used to prepare sub-specifications for the four views (blocks 44, 46, 48 and 50, FIG. 3). The preparation of each sub-specification will be discussed in detail below.

Having these different views gives the user a better understanding of a proposed distribution design. It allows the user to focus on one aspect of the design at a time. All of these views are stored separately in the data model 34 (FIG. 2). The user may also have multiple alternatives for each view which are all stored as separate objects in the data model.

In the preferred embodiment, the data model is in file format that provides persistence support for the objects for the different views. It would be obvious to a person skilled in the art that other formats could be used, such as a database.

For performance analysis (block 52, FIG. 3), the user chooses alternatives from each view and presents these objects to the performance modeling tool. This is discussed in detail below in relation to FIG. 8. By choosing different alternatives from a given view, the user specifies a different design alternative. This will simplify the process for the user to find the optimal design from a set of design alternatives. This is very useful since the tool is meant for use at application design time.

The performance modeling tool constructs the performance model based on the user's specification. The model is a set of entities with each entity representing a host, a communication device, a client process or a server process. A process is a client process if it is not invoked by other processes. A process may have multiple entries with each entry representing a method. Links are used in the model to represent method invocations and resource usages. A link from one entry of a process to another entry of another process indicates a method invocation. A link from an entry of a process to a host or a communication device indicates a resource usage from the process. Links can not exist among host entities and communication device entities.

In the preferred embodiment, the performance engine uses the method of layer technique (discussed above) to analyze the user's performance model.

The performance modeling tool reports many different performance results (block 54, FIG. 3). The results include utilization, response time, inter-arrival time, throughput, queuing length and idle time. Three analysis choices are offered to the user; utilization analysis, analytical method and simulation method. The utilization analysis is a quick way for users to find out if a component in the design is over-utilized (or becomes a bottleneck). The analytical method and the simulation method are two different ways to analyze the constructed performance model using the method of layer technique, in the preferred embodiment.

In the preferred embodiment, the performance modeling tool handles distributed OO applications. The environment that supports the execution of a user's application consists of a set of hosts interconnected using communication devices. Objects are capsuled into partitions. Partitions can be placed on hosts to become processes. Processes can have multiple threads. Methods can invoke each other, with the exception that no cyclic invocation can be use. If a method invokes another method on a different host, such an invocation is achieved through a middleware, such as Distributed Computing Environment™ (DCE) of the Open Software Foundation. To do performance modeling and analysis on an application, the user needs to specify the partitions in the applications, how partitions are placed on hosts, the capacity of each host, the capacity of each communication device, the connectivity of the hardware configuration, the interactions among methods, resource demand of each method, how often a method is invoked, how often external requests are made to the application, etc.

The following is a detailed description of the preparation of each sub-specification. The order of preparation of the sub-specifications is important in the following respects: the partition view (that defines the objects) must be defined before the scenario view can be defined; also, the workload view, which imports parameters defined in the other three views, must be defined last. Although these are discussed in order, in fact, the user determines the order of preparation and, if permitted by the operating system used, the user can interrupt work on one window or view to work on any other, and return to continue work on the original window at any time.

Partition View

Figure 4:
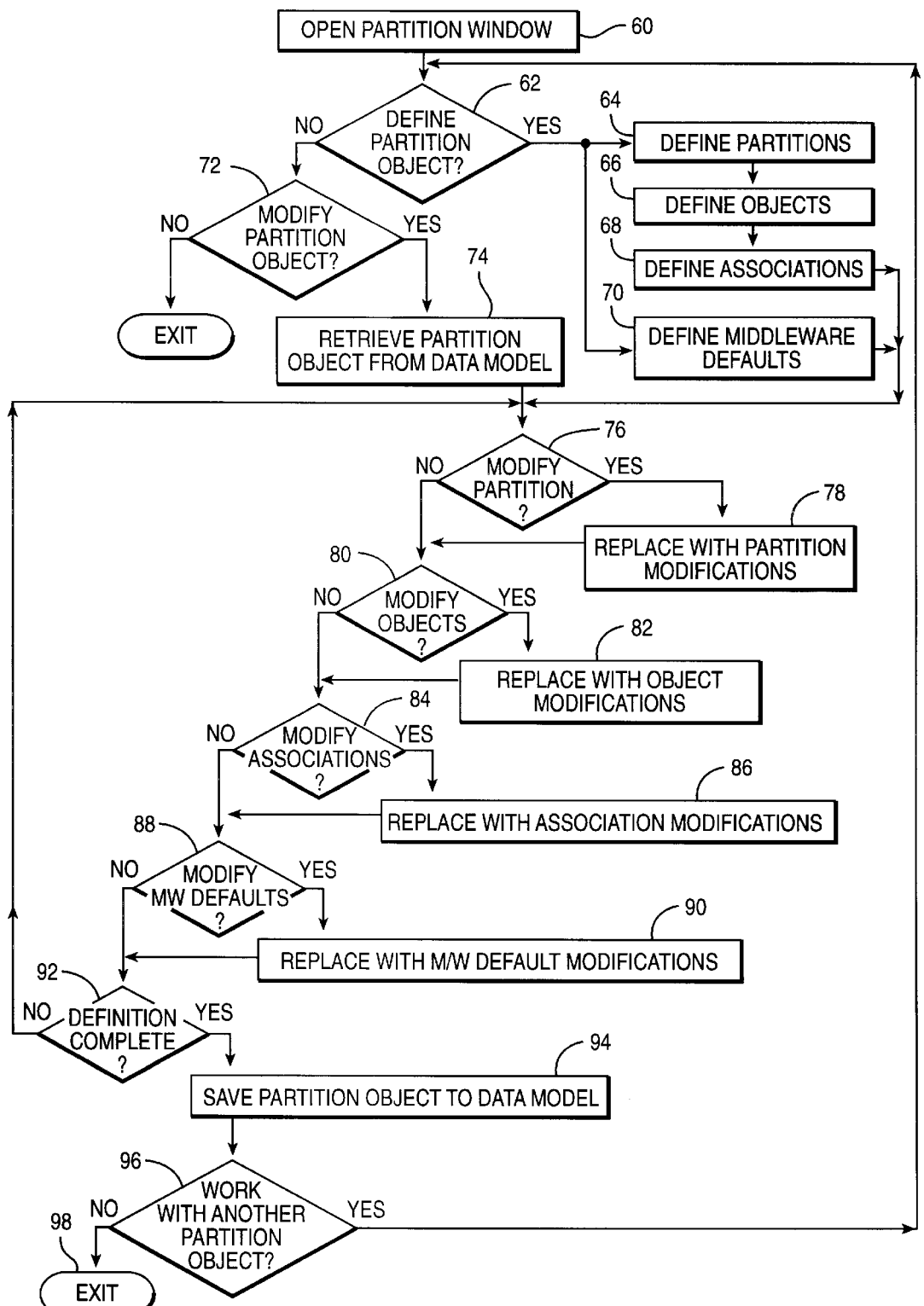
FIGS. 4 through 7 are flow diagrams illustrating the steps for preparing the sub-specifications for alternate partition, scenario, topology and workload views, respectively, according to the invention.

The partition view allows users to define new objects and group objects into logical entities called partitions. The objects are instantiations of class definitions imported into the partition view. Objects, associations, partitions and middleware defaults are defined and manipulated through the partition view. FIG. 4 is a flow diagram illustrating the preparation of the sub-specification for the partition view.

Figure 9:
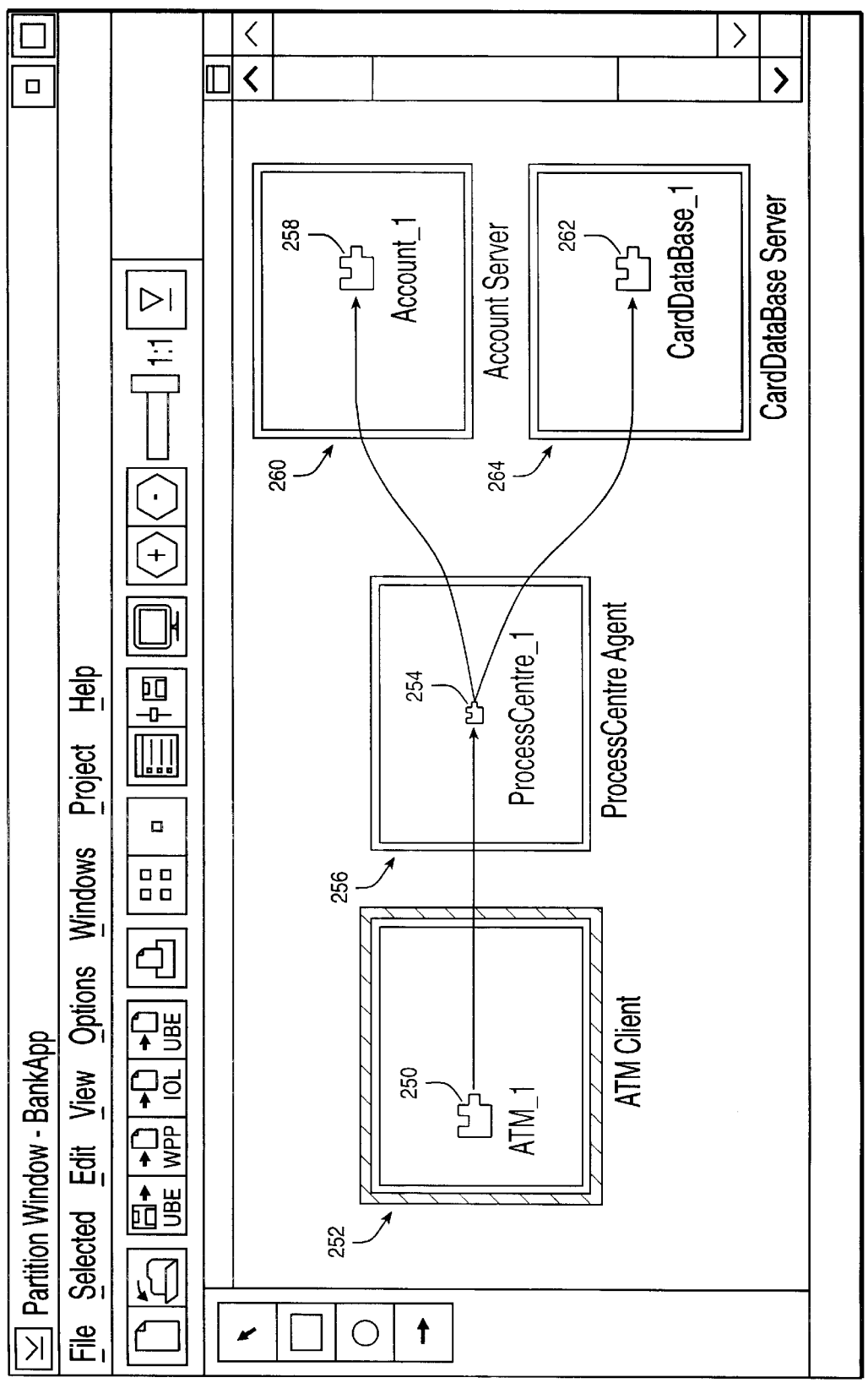
FIG. 9 through 12 are schematic illustrations of window presentations for the partition, scenario, topology and workload views, respectively, according to the preferred embodiment of the invention.

Referring to FIG. 4, the user opens the partition window (block 60). A partition window, according to the preferred embodiment, is shown in FIG. 9, and will be discussed in greater detail below in association with the banking example given to illustrate operation of the performance modeling tool of the invention.

The user can elect to define a new partition object (block 62), and to that end, can enter information defining first the partitions, then the objects and finally the associations (blocks 64, 66, 68). The middleware defaults can be defined at any time during the definition of the other parameters (block 70).

By definition, a distributed application will contain at least two partitions, a server partition and a client partition, although any number of partitions are supported. A server partition contains a collection of services offered by different objects inside the partition. A client partition contains objects that make requests to services offered by the server partition.

Partitions can be placed on hosts to become processes. Once a partition is placed on a host, all the objects inside the partition are also placed on that host. A partition can be placed on multiple hosts. This indicates service requests may come from different hosts or service may be duplicated on different hosts to improve reliability.

In addition to defining objects and partitions, the user can also define the interactions between partitions through the partition view. Normally, partitions are placed on different hosts. An interaction between two partitions normally indicates a method invocation through some type of middleware. The partition view allows the user to specify the type of middleware and other middleware specific values to be used for each interaction. Multiple types of middlewares can be specified for a given interaction. This implies the client partition and the server partition can use any one or more of the middlewares for communication. Also, middleware values or properties can be defined at any level. For example, the middleware properties for a partition are inherited (through object oriented inheritance) from the middleware properties defined for the application, but the properties in the partition middleware can be modified. Similarly, the middleware properties for an object residing in a partition are inherited from the partition, and for an association are inherited from the object. These can be further modified at each level.

The user can also modify an existing partition object (block 72). The partition object is retrieved from the data model (block 74) and displayed in the partition window. The user can then modify the partitions (blocks 76, 78), the objects (block 80, 82), the associations (blocks 84, 86) and/or the middleware default values (blocks 88, 90). The user can also modify any parameters in a newly-defined partition object before it is saved as a persistent object. Once the current partition object is defined as the user desires (block 92), it can be saved to the data model (block 94), and the user can work with or define another partition object (block 96), or exit the window (block 98).

Scenario View

Figure 5:
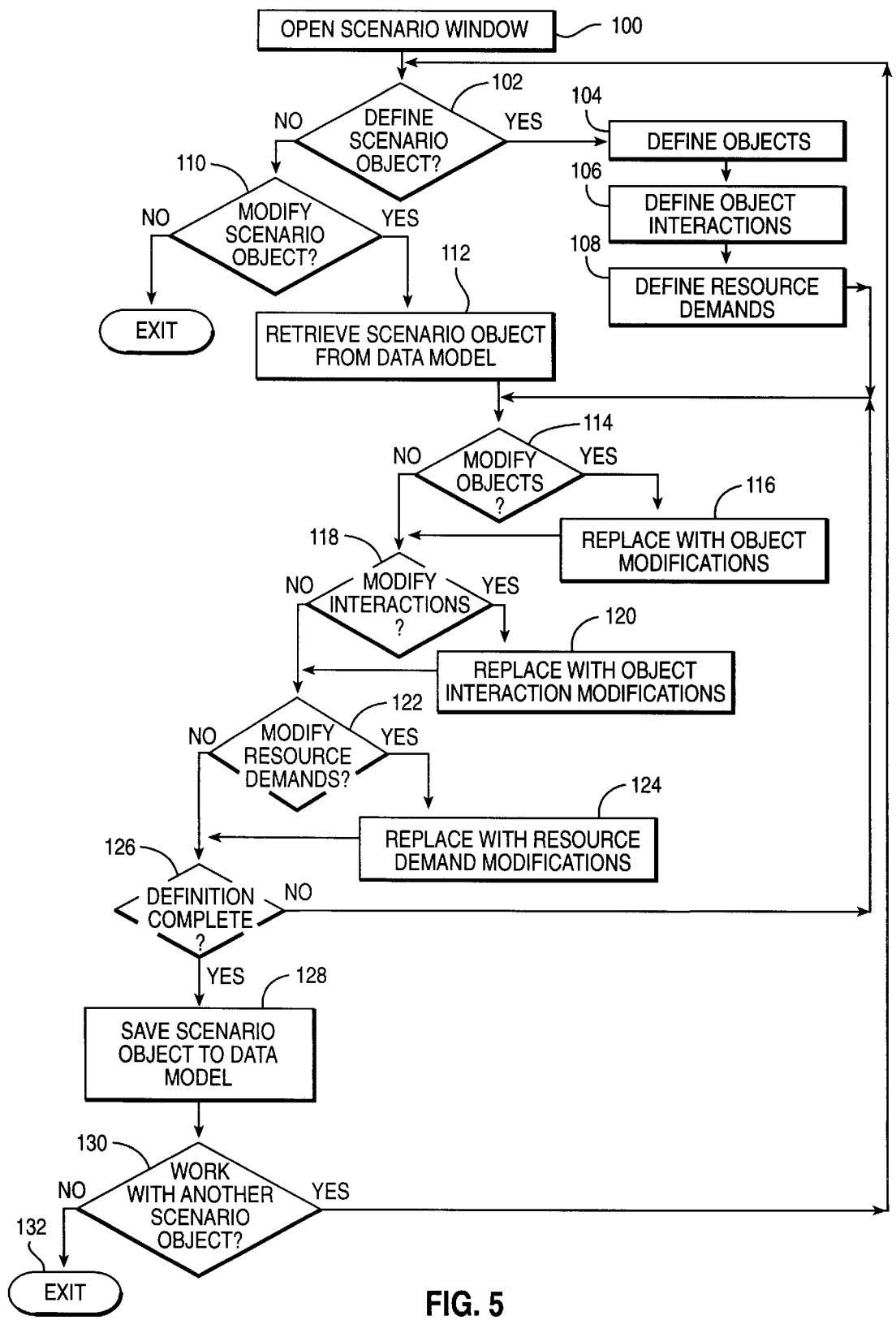
Figure 10:
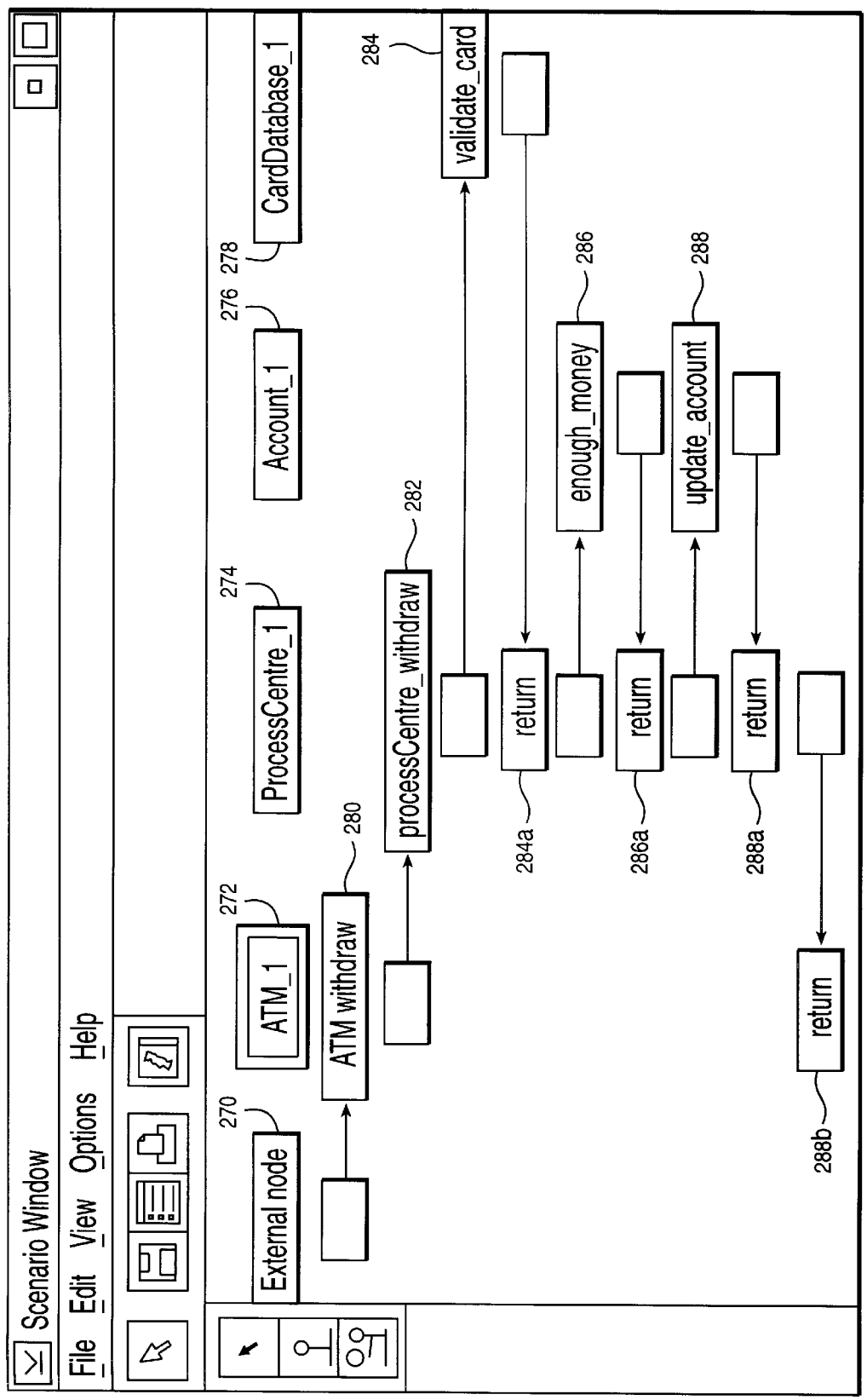

In the scenario view, the user specifies how objects in the user's design interact with each other. This is illustrated in the flow diagram of FIG. 5. The preferred embodiment uses a scenario window, such as illustrated in FIG. 10, to help the user define the scenario view. (FIG. 10 is discussed in detail below.) Objects along with the methods in these objects are first extracted from partition views. These objects are then placed in the scenario window for visualization.

A scenario consists of a series of scenario events. A scenario starts with an external event such as a customer going to an ATM machine to perform a cash withdraw. Such an external event will trigger a series of internal events to occur. A scenario describes what internal events are triggered, which objects and methods respond, how they interact with each other, what amount of resource they need, and the amount of data transferred between methods.

An application can have multiple scenarios with each describing how an external event is handled by the application. This implies if the user's application has N different external events, N scenarios are needed.

In defining the sub-specification for the scenario view, according to the invention, the user first opens the scenario window (block 100, FIG. 5), and elects either to define a new scenario object (block 102) or modify an existing object from the data model (block 110). If the user is defining a new scenario object, the user can first define objects (block 104), then object interactions (block 106) and finally resource demands (block 108). If the user wants to modify an existing scenario object, the scenario object is retrieved from the data model (block 112). Modifications can be made to the objects (blocks 114, 116), object interactions (blocks 118, 120) and/or resource demands (blocks 122, 124), before the scenario object is saved or saved back to the data model (blocks 126, 128). The user can world with another scenario object (block 130) or exit the window (block 132).

A directed link is used in the scenario view to represent a method invocation (see FIG. 10). The starting point of the link represents the caller method and the end point of the link represents the callee method. When such an invocation is entered into a scenario, the user is asked to provide an invocation count and the resource demand of the callee method on potential host types. In case the caller method and the callee method are on different hosts, the user needs to provide the size of data to be transferred in the method call for such an invocation. This information is used by the performance modeling tool to estimate the middleware overhead used by the invocation.

By only allowing the user to specify the resource demand on potential host types, the performance modeling tool of the present invention makes scenario views independent of topology views. The user can map a given scenario to a set of topology alternatives and explore the impact of different topology alternatives on the scenario (and ultimately, the impact on the whole design). Even for a given external event, the user can define multiple scenarios, one for each potential design alternative. In this way, the user can easily investigate the impact of different scenario alternatives on a design.

Topology View

Figure 6:
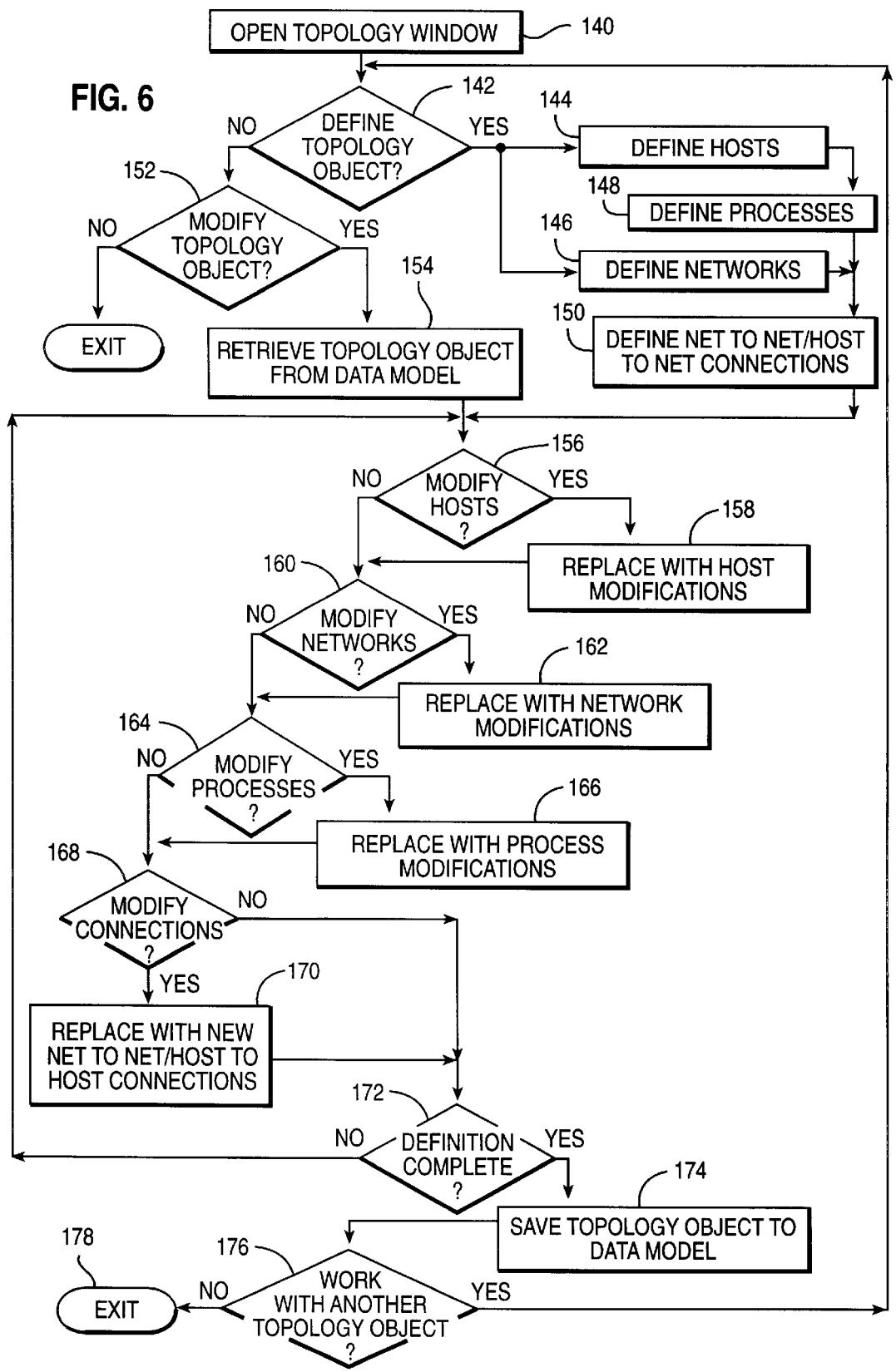
Figure 11:
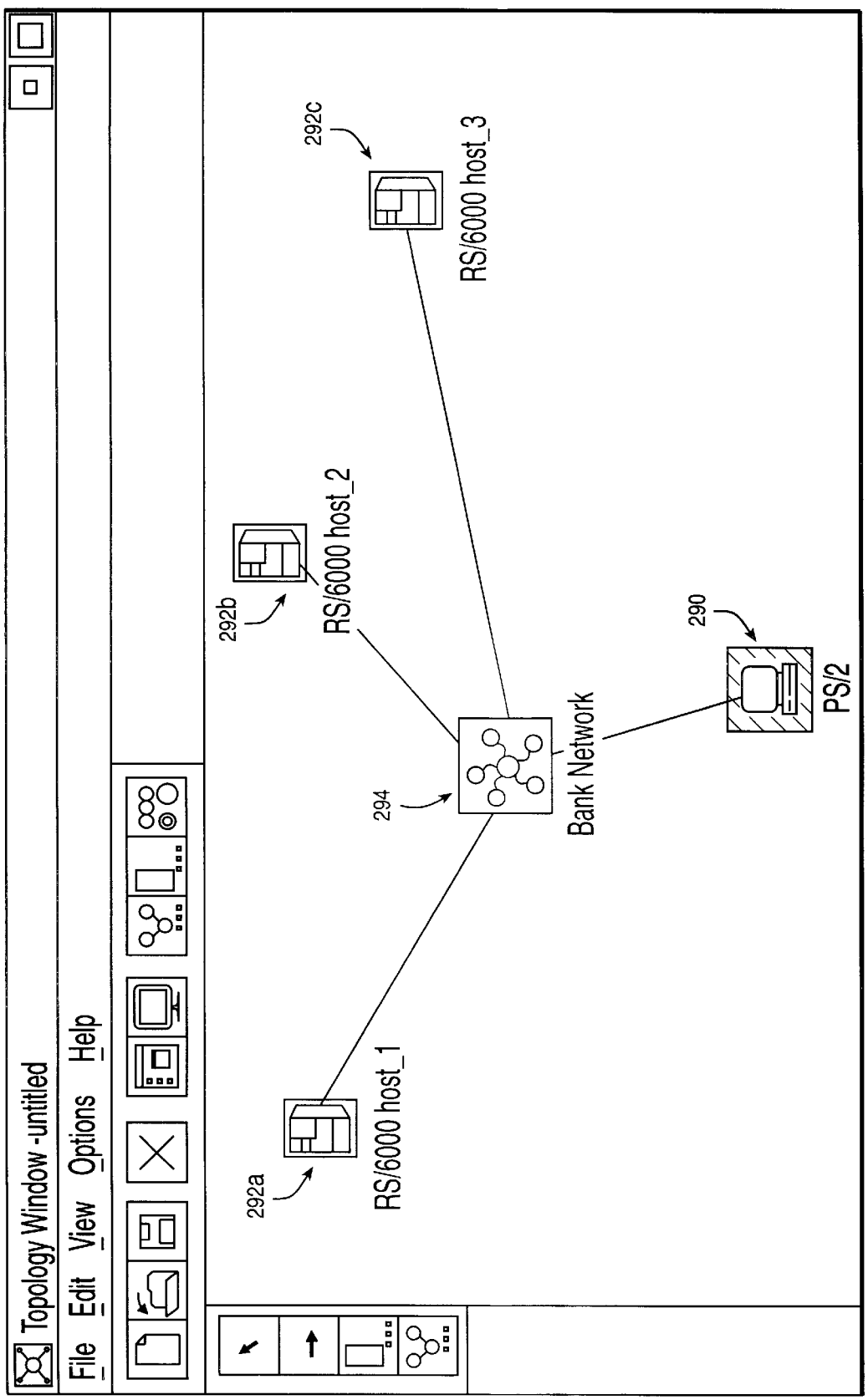

The topology view provides the user with a view of the hardware configuration and the distribution of software components amongst the user's hardware configuration. The user defines topology views by using a topology window, such as illustrated in FIG. 11 discussed in detail below. The steps to create or modify the topology view are shown in FIG. 6.

Once inside a topology view (i.e., after opening the topology window-block 140), the user can create and modify the hardware configurations on which the user's application will reside (blocks 142, 152–154).

Hosts and networks are placed in the topology view (blocks 144, 146). A host can be connected to zero or more networks, and networks can be connected to zero or more other networks. The performance modeling tool gives users the ability to represent multiple copies of a host, thereby providing convenience and ease-of-use for large, complex hardware configurations.

Once the user has created hosts in the topology view, partitions can then be deployed on these hosts. Deployment of a partition onto a host, or the act thereof, creates an entity on the host called a process (block 148). A partition can be deployed on several hosts within the same topology view. This represents the situation where services are replicated on different sites to heighten reliability, serviceability and availability. Furthermore, clients are able to request services from different sites under this paradigm.

Similarly, a process on a host can represent multiple instances of the process within the same host.

Additional activities are likely to occur on the hosts and networks that run portions of the user's application. The user can associate percentages of additional workload on these participating hosts and networks (blocks 144–146). These percentages are taken into consideration during the performance modeling and analysis stages. An accurate account of all activities running on the participating hosts and networks will produce more realistic performance data for the user's application environment.

Once the hosts and networks have been defined the user can define the connections between them (block 150).

Having defined a topology object, the user can modify any of its parameters (blocks 154–170), and when finished (block 172), saves the newly defined or modified topology object to the data model (block 174).

Users can define more than one topology object through the topology window (block 176). Each topology object represents one topology alternative and all topology objects are separately stored in the data model. During the performance modeling and analysis stages, the user decides which topology is to be used. By storing multiple topology alternatives, users are able to explore a variety of topology situations in order to find the best topology that suits the user's requirement.

Workload View

Figure 12:
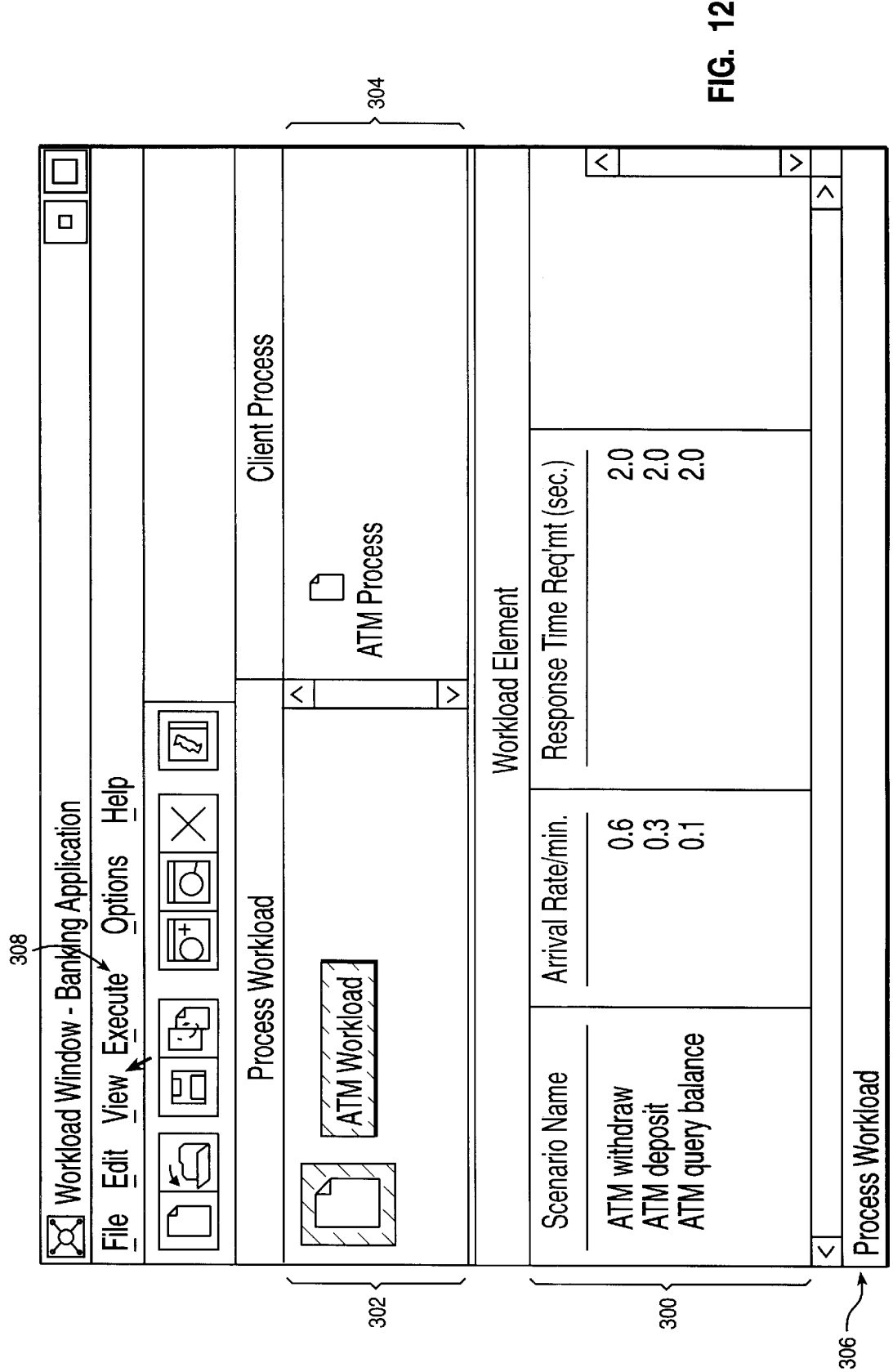

The workload view allows the user to specify the characteristics of the input to the user's application, and can be manipulated through a window of the type illustrated in FIG. 12. (FIG. 12 is discussed in detail below in connection with the Banking Example.)

In the case of a banking example, service requests (that is, external events) may arrive at automated teller machines (ATMs) and bank tellers at different rates. Some service requests may only be handled by bank tellers. Through the workload view, users are allowed to define what types of service requests will arrive at each client process and how often these requests will arrive. The defined workload view, in combination with the partition, scenario and topology views, makes up the complete specification for the user's application.

Figure 7:
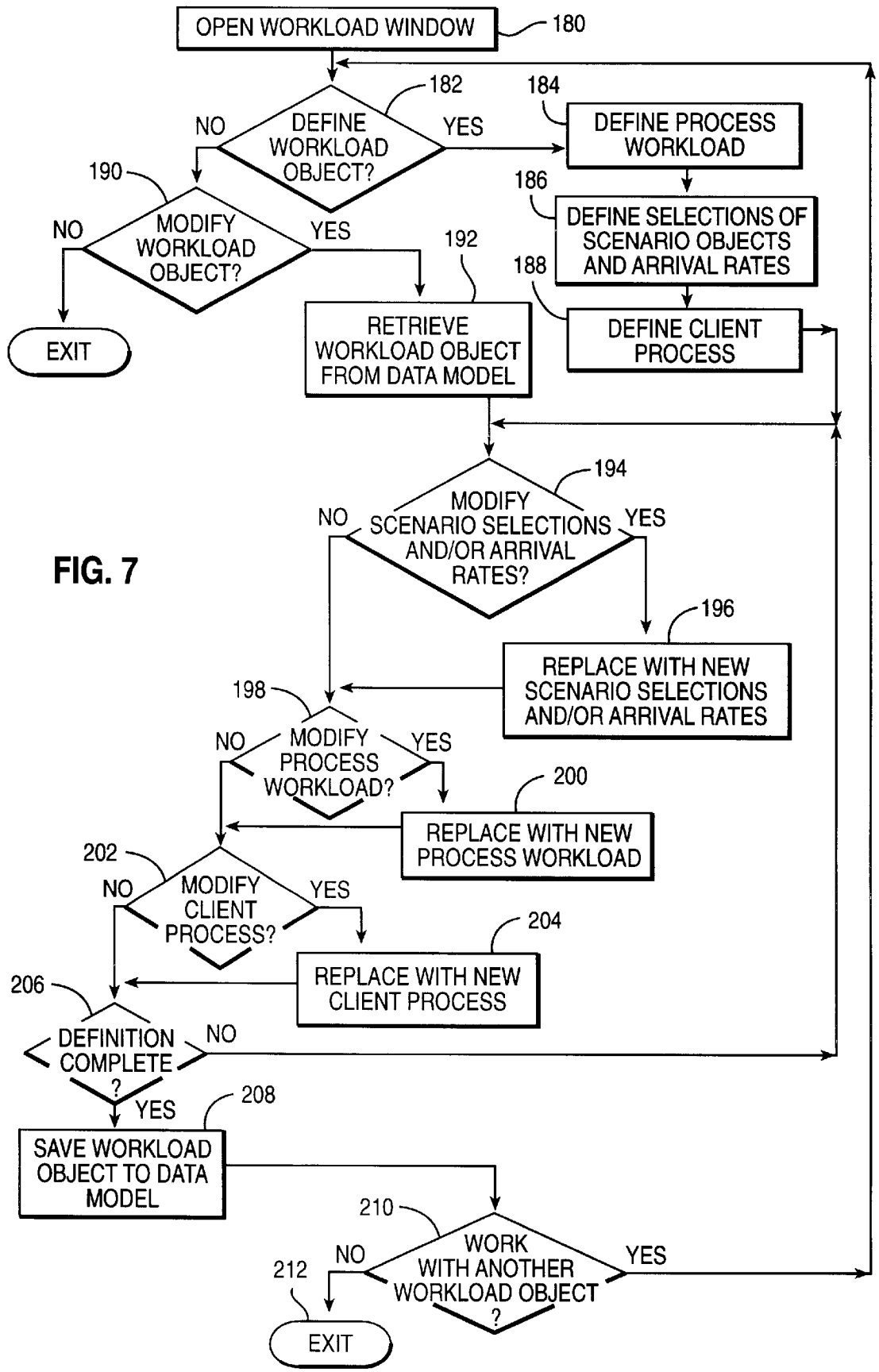

The steps for defining or modifying the workload sub-specification are set out in FIG. 7. The user opens the workload window (block, 180), and then decides whether to define a new workload object (block 182) or to modify an existing workload object (block 190). If the user is modifying an existing workload object, it is retrieved from the data model (block 192).

A workload view consists of a Process Workload container, a Client Process container and a Workload Element container. The content of the Workload Element container is used to describe the selected process workload object in the Process Workload container (block 184). Each workload element object defines the arrival rate and optionally the required response time of an external service request (block 186), such as a "Withdraw cash" scenario in the ATM example. The user can group multiple service requests in a process workload object and associate one or more client processes to it. When a client process is associated with a process workload object (block 188), it means the workload of the client process is defined by the process workload object. The Client Process container lists all the client processes that have the same process workload characteristics that is defined by the selected process workload object in the Process Workload container.

The user can modify any of these parameters (blocks 194–204), prior to completing the definition of a single workload object (block, 206) and have it saved to the data model (block 208).

The user can define multiple workload views (block 210) before exiting the workload view (block 212). Each workload view represents one input alternative. All workload views are stored as separate application workload objects in the data model. The user can use the performance modeling tool to investigate the impact of different workload alternatives on the user's application performance.

In addition to defining workload views, performance modeling can be activated through the workload window. The user can perform a quick utilization analysis, or carry out performance analysis using the analytic method or simulation method.

Building Performance Models from Specifications

The performance model is constructed using the performance sub-specifications for each of the four views, as provided by the user. These performance sub-specifications are merged into a complete performance specification and a performance model is built for analysis. Since the performance sub-specifications provided by the user could be prepared independently, they may contain information that duplicates or conflicts, or may even omit information.

To construct a performance model to represent the user's application, the performance modeling tool of the present invention first determines which hosts, partitions, processes, methods are actually used in the user's application. Unused objects will not be included in the performance model even if they are referenced in certain performance sub-specifications.

Figure 8:
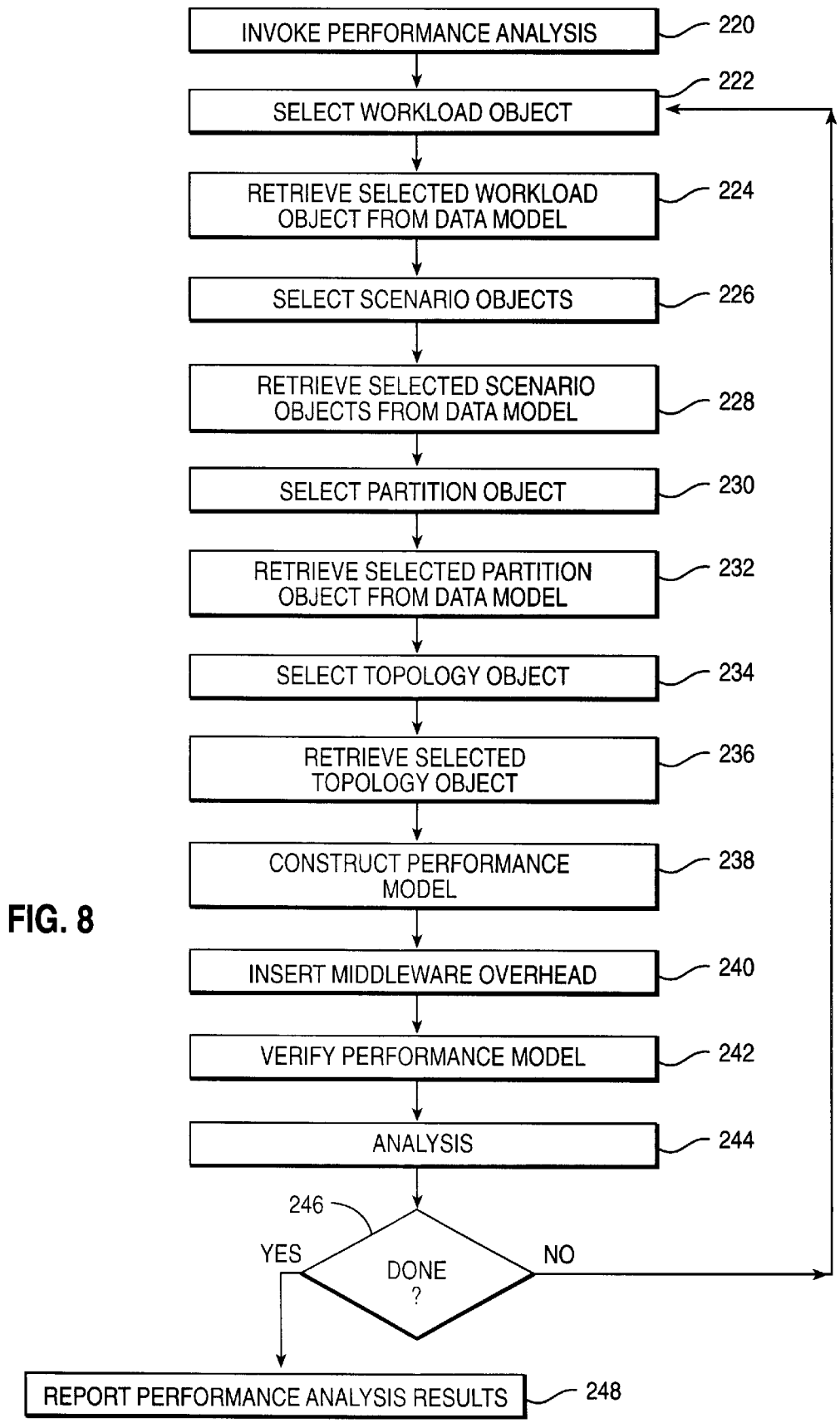
FIG. 8 is a flow diagram illustrating the steps for analyzing performance of a selection of sub-specifications for the four different views.

From invocation of performance analysis (block 52 of FIG. 3, block 220 of FIG. 8), a specific workload object is selected and retrieved (blocks 222, 224, FIG. 8). From the selected workload view it can be determined what scenarios are used, what processes are client processes, the arrival rate of each external event on each client process, the extra resource usage for each client process to handle an external event, etc., and from this, the appropriate scenario objects are selected and retrieved from the data model (blocks 226, 228).

The performance modeling tool then examines each scenario used to determine all partitions used, all objects used, all methods used, all possible host types used, the interactions between different methods, the resource usage of a method on different host types once the method is invoked, etc. From this information the partition object is selected and retrieved from the data model (block 230, 232).

Given a partition residing on a set of potential host types, the topology view is then searched to find the actual processes corresponding to that partition. A partition may be placed on different hosts with different host types. This search will yield all processes and all hosts used in the user's application. All communication devices that these hosts connected to are also included in the performance model for the user's application. The appropriate topology object is selected based on this information (block 234) and retrieved (block 236).

The retrieved objects from the four performance views are used to construct the performance model (block 238).

If one process invokes another process and these two processes reside on different hosts, appropriate values will be found to represent the middleware overhead and these middleware overhead values automatically inserted into the performance model (block 240).

Three types of middlewares, DCE, TCP/IP and MQI, are supported in the preferred embodiment of the invention. The overhead of each middleware is characterized by a set of key parameters. These parameters are used to determine what overhead values should be used during performance modeling and analysis. When the user defines an application to be modified, the user only needs to specify these parameters, and the performance modeling tool will use these parameters to find the corresponding middleware overhead values and use these values in the performance modeling.

Taking DCE as an example, five parameters are used to specify DCE's overhead: client host type, server host type, communication device type, data transfer size and protection level. The DCE overhead is divided into three parts: client middleware overhead, server middleware overhead and communication overhead. The client middleware overhead is specified using client host type, data transfer size and protection level. The server middleware overhead is specified using server host type, data transfer size and protection level. The communication overhead is specified by communication device type and data transfer size. These three sets of overhead are kept in three different overhead tables.

When the user indicates that method $M_1$, in partition $Partit_1$ invokes method M2 in partition $Partit_2$, the user must also indicate that the data transfer size if the processes for these two partitions reside on different hosts. In the partition window, the user specifies the type of middleware used for the communication between these two partitions (in the current example, assume it is DCE) and the level of the protection to be used.

For this example, $Partit_1$, acts as a client and $Partit_2$ acts as a server. For each process $Proc_1$ in $Partit_1$ and each process $Proc_2$ in $Partit_2$ the host type (client host type) of the host for $Proc_1$ and the host type (server host type) of the host for $Proc_2$ are determined. The data transfer size for this invocation is provided by the user when defining the method invocation in the scenario window. The user can specify the protection level defining the two partitions in the partition window. These parameters are used to find the client middleware overhead value and the server middleware overhead value. As for the communication overhead, the performance modeling tool will search the topology to find which communication links these two processes will use. The corresponding communication device type and the data transfer size are used as parameters to get the communication overhead value.

Users can directly access the middleware overhead tables located in the tool. In this way, the user can modify existing data or add new data into these tables to better represent their own environment.

The preferred embodiment also provides estimated middleware overhead values when such values are not available in the middleware overhead tables. For example, a performance ratio is associated with each host type. When a middleware overhead value for a given host type $HT_1$ is not available, the tool will search the middleware overhead tables to find another host type which has a compatible middleware overhead value, and will then use the performance ratios of these two host types to project an estimated value for $HT_1$. Similarly, if the middleware overhead value for a data size is not available, the curve-fitting method is used to project an estimated value for that data size.

A partition may result in multiple processes. Since each process is represented by a separate entity in the model, a method invocation specified in the scenario sub-specification may result in an invocation to each process containing such a method. The number of invocations to the method as specified in the scenario sub-specification is equally distributed to all these processes. This represents the situation where a service is duplicated and a caller randomly selects an available server for service.

Although different sub-specifications provide users with better understanding and better management of their design alternatives, they pose difficulties for performance model construction. Since sub-specifications are defined independently, they may conflict with each other or miss some key information to complete the performance model. As part of the performance model construction, consistency is verified among different objects for different views. A check is also performed for missing information for which the tool cannot provide default or estimation, whether there is any conflict or error in the user's design. This is referred to as verification of the performance model (block 242). The constructed performance model is finally given to the performance engine for analysis (block 244).

When complete (block 246), the tool reports performance analysis results for hosts, communication devices and processes that are used in the user's application. The results include utilization, response time, inter-arrival time, throughput, queuing length and idle time (block 248), as illustrated in the following example.

A Banking Example

A simple banking application will be considered. The application needs to support at least one thousand automated teller machines (ATM) around a small city. A customer must be able to access his/her account through an ATM, to deposit money, withdraw money and query the balance in the account. For each transaction, the customer will present a banking card as authorization. The bank has a network of PS/2 and RS/6000 hosts.

This banking application requires four classes: ATM, ProcessCentre, Account and CardDatabase. As illustrated in the Partition View or Window of FIG. 9, an ATM object 250 will reside in the ATM Client Partition 252, a ProcessCentre object 254 will reside in the ProcessCentre Agent Partition 256, an Account object 258 will reside in the Account Server Partition 260 and a CardDatabase object 262 will reside in the CardDatabase Server Partition 264. The application will use DCE as the middleware for the associations between partitions.

In the Topology Window of FIG. 11, the user adds hosts, networks and connections between networks and hosts. In FIG. 11, there are PS/2 hosts 290, RS/6000 hosts 292 and a network 294. The user has the ability to specify information specific to individual hosts and networks. This may include other workload, and other performance characteristics. After visually describing the hosts and networks, the user can specify which partitions (defined in the Partition window of FIG. 9) can be placed on hosts. Multiple partitions can be placed on a single host. In this example, the ATM Client Partition will be placed onto the PS/2 host 290, the ProcessCentre Agent Partition, onto RS/6000 host_1 292a, the Account Server Partition onto RS/6000 host_2 292b and the Card Database Partition onto RS/6000 host_3 292c. When a partition is placed onto a host, a process is created. In the present banking application, four processes are created: ATM Client Process, ProcessCentre Process, the Account Process and the CardDatabase Process.

In the topology window according to the invention, one host can also represent many identical hosts. In this example, there is one PS/2 host 290 shown but it will represent 1000 PS/2 hosts. When the ATM Client Partition is associated with the PS/2 host, 1000 ATM Client Processes are created. This is to provide the user with a fastpath way of describing many identical hosts and processes easily.

TABLE 1

Partition, Host and Process Relationships

| Partition | Host | Process | Other Host Workload |
|---|---|---|---|
| ATM Client Partition | PS/2 | ATM Client Process | 5% |
| ProcessCentre Agent Partition | RS/6000 host_1 | ProcessCentre Process | 25% |
| Account Server Partition | RS/6000 host_2 | Account Process | 25% |
| CardDatabase Server Partition | RS/6000 host_3 | CardDatabase Process | 25% |

TABLE 2

Network values

| Network | Other Network Workload |
|---|---|
| Bank Network | 10% |

In the Scenario Window of FIG. 10, the user needs to specify the scenarios that would occur in the application when an ATM Withdraw scenario is initiated from an external node 270. Within the scenario, the user specifies the objects and methods required for the scenario. In this example, ATM Withdraw, the scenario is described by four objects: ATM_1 (ATM) 272, ProcessCentre_1 (ProcessCentre) 274, Account_1 (Account)276, CardDatabase_1 (CardDatabase) 278; and seven (7) methods: ATM_Withdraw 280 initiated at the ATM, processCentre_withdraw 282 occurring at ProcessCentre, validate_card 284 occurring at CardDatabase, enough_money verification 286 at update_account 288 occurring at Account, dispense_money occurring at ATM, and issue_receipt also occurring at ATM. The last two methods are not illustrated in FIG. 10 because they are local but are included in this description for completeness. Also, returns are included to fully illustrate the application logic.

The user may specify performance information for client overhead and method resource demand. The client overhead represents any additional work the client must do before invoking the ATM Withdraw event 280. The method resource demand captures information such as the amount of CPU time required to service the method, the amount of device time required to service the method and the amount of data being transferred across the network (if applicable). The user enters this information on a per host type basis. The resource demand may be entered for many different host types. This allows the user to move the partitions onto different host types without having to return to the scenario window to update the resource demand information. At run time, the correct resource utilization is obtained by determining which host type is executing the scenario. How this determination is made is explained later in the example when the Workload window is discussed.

TABLE 3

Scenarios

| Scenario Name | Method | CPU time (maec) | Amount of data (bytes) | Host Type |
|---|---|---|---|---|
| ATM Withdraw | ATM Withdraw | 6 | 0 | PS/2 |
|  | processCentre_withdraw | 5 | 300 | RS/6000 |
|  | validate_card | 5 | 200 | RS/6000 |
|  | enough_money | 5 | 200 | RS/6000 |
|  | update_account | 5 | 200 | RS/6000 |
|  | dispense_money | 2 | 0 | PS/2 |
|  | issue_receipt | 2 | 0 | PS/2 |
| ATM Deposit | ATM Deposit | 6 | 0 | PS/2 |
|  | processCentre_deposit | 5 | 300 | RS/6000 |
|  | validate_card | 5 | 200 | RS/6000 |
|  | get_money | 2 | 0 | PS/2 |
|  | processCentre_update | 5 | 200 | RS/6000 |
|  | update_account | 5 | 200 | RS/6000 |
|  | issue_receipt | 2 | 0 | PS/2 |
| ATM Query Balance | ATM Query Balance | 8 | 0 | PS/2 |
|  | processCentre_query | 5 | 300 | RS/6000 |
|  | validate_card | 5 | 200 | RS/6000 |
|  | get_balance | 5 | 200 | RS/6000 |
|  | display_balance | 2 | 0 | PS/2 |

In the Workload Window (FIG. 12), the user needs to specify the scenarios that make up a process workload. The process workload is a list of scenarios, the arrival rate of the scenarios per unit of time, and optionally, the user may specify a user required response time. An example of a process workload is:

TABLE 4

A process workload for an ATM representing a typical day

| Scenario | Arrival Rate (minute) | User Required Response Time (sec) |
|---|---|---|
| ATM withdraw | .6 | 2 |
| ATM deposit | .3 | 2 |
| ATM query balance | .1 | 2 |

In this process workload area 300, there are three workload elements. Each workload element contains a scenario, an arrival rate, and a user required response time. The arrival rate differs for each scenario and a user required response time is specified for each scenario.

The user can specify many different process workloads in the process workload area 302. Each process workload needs to be associated with a client process in the client process area 304. The possible client processes are specified in the topology window. In this example, there is one client process (ATM Client Process). Therefore, the process workload defined above, will be associated with the ATM Process client process. From the ATM Process, the performance modeling tool is able to determine which hosts each of the processes will run on. In this example, the ATM Process client process runs on the PS/2 host 290, the ProcessCentre Process runs on RS/6000 host_1 292a, the Account Process will run on RS/6000 host_2 292b, and the CardDatabase Process will run on RS/6000 host_3 292c. From this, the scenarios execution targets can be determined.

Once the user has finished defining the process workloads, the client processes and the workload elements, the user can run the performance engine. In the preferred embodiment, by choosing Execute 308 in the Workload Window, the user can choose the required type of performance analysis from three types of performance analysis provided: utilization analysis, performance analysis or performance simulation. (This would be determined by the user selecting a choice from, for example, a pop-up dialogue menu, before execution of the performance analysis is actually involved.) In the preferred embodiment, the user can also specify certain parameters such as the tolerance for a simulation analysis and the length of time to run simulation before cut-off, etc.

Utilization analysis only determines utilization benchmarks for the application. Performance analysis uses formulas and algorithms to determine all the performance benchmarks. Performance simulation uses a combination of simulating the application and the theoretical model to determine the performance benchmarks. The workload view provides the process workloads from this Process Workload area 306 and the execution environment from entries in its Client Process area.

In this example, utilization analysis is chosen. After the performance run is complete, the results are returned to the user. Using the above example, here are the results:

TABLE 5

Results from Performance Utilization

| Entity | Utilization |
|---|---|
| PS/2 (ATM) | 5.04% |
| RS/6000 (ProcessCentre) | 51.49% |
| RS/6000 (Account) | 45.69% |
| RS/6000 (CardDatabase) | 37.93% |
| Bank Network | 183.65% |

From the above results, it is clear that the network is over-utilized. The user needs to lower the utilization of the network. Here are some options to solve the over-utilization problem on the network:

1. Use a faster network.
2. Try to reduce the network traffic by placing the client partition and agent partition onto the same host.
3. Try to reduce the network traffic by placing the agent partition onto the same host as one of the server partitions.
4. Try to reduce the network traffic by placing the agent partition and both server partitions onto the same host.

Assume that the ProcessCentre agent partition, Account server partition and Card Database server partition are placed on the same host (Option 4). This change does not impact the partition view but the user must modify or define a new topology object. In the topology view, the user should delete the Account Process from RS/6000 host_2 and the CardDatabase Process from RS/6000 host_3 and recreate these processes on RS/6000 host_1. Now, there are 3 processes residing on RS/6000 host_1: ProcessCentre process, Account process and CardDatabase process. The ATM client partition will continue to reside on the PS/2 host as the ATM client process. This cuts down considerably on network traffic, as the only network utilized method calls will be between the ATM client partition and the ProcessCentre agent partition. The new relationships between the partition, host and process are as follows:

TABLE 6

Partition, Host and Process Relationships

| Partition | Host | Process | Other Host Workload |
|---|---|---|---|
| ATM Client Partition | PS/2 | ATM Client Process | 5% |
| ProcessCentre Agent Partition | RS/6000 host_1 | ProcessCentre Process | 25% |
| Account Server Partition | RS/6000 host_1 | Account Process | 25% |
| CardDatabase Server Partition | RS/6000 host_1 | CardDatabase Process | 25% |

The scenarios do not have to change because the resource demand values were given with respect to host type. Since the calls between the agent (ProcessCentre) and the servers (Account, CardDatabase) are no longer distributed, the amount of data field in the scenario is ignored. Therefore, no changes are required to the scenario viewer or to the workload viewers. After invoicing the performance engine, the following results were yielded:

TABLE 7

Results from Performance Analysis

| Entity | Utilization | Response Time (sec) |
|---|---|---|
| RS/6000 | 59.59% | |
| PS/2 | 51.89% | |
| Bank Network | 59.03% | |
| ATM process | 0.28% | .169 |
| Account process | 23.64% | |
| ProcessCentre process | 51.08% | |
| Card Database process | 15.72% | |

From the above results, the utilization values are acceptable. Therefore, it can be assumed that in this application, it is a better solution to have the 3 partitions (ProcessCentre Partition, Account Partition and Card Database partition) on one host to reduce network traffic. This solution can use existing hosts and networks, and still achieve acceptable performance.

The embodiments of the invention which an exdusive property or privilege is claimed are defined as follows:

1. A mechanism for providing performance projections for designs of an application over a distributed system, comprising:

means for defining different parameters of the application and the distributed system as a plurality of views including a partition, scenario, topology and workload views;

means for separately storing the defined parameters as persistent objects for each of said views;

means for modifying the stored persistent objects within each of said views; and means for providing analyses of user selected groupings of the stored persistent objects that define different performance scenarios based upon each of said views.

2. A mechanism, according to claim 1, wherein the means for defining different parameters of the application and the distributed system comprise a graphical user interface adapted to receive input from a user and schematically display distributed objects and networks from the distributed system, and interaction links between the distributed objects from the application, and wherein the means for storing the defined parameters as persistent objects comprise means to store as separate objects alternate distributions of the distributed objects and alternate interaction links between the distributed objects.

3. A mechanism, according to claim 2, wherein the means for modifying the stored persistent objects comprise means for recalling the stored persistent objects to the graphical user interface.

4. A mechanism, according to claim 1, wherein the means for providing analyses, comprises:

means for selecting a set of parameters defining a distributed system from the stored persistent objects;

means for simulating an application process over the set of parameters; and means for providing performance results of the simulation.

5. A mechanism, according to claim 1, wherein the means for defining different parameters of the application and the distributed system comprise a graphical user interface having a plurality of views of the application and the distributed system, at least one view representing a partition view adapted to receive input from a user and schematically display a plurality of distributed objects and interaction links between the distributed objects.

6. A mechanism, according to claim 5, wherein the partition view further comprises means for defining middleware communication values in the interaction links.

7. A mechanism, according to claim 5, wherein the plurality of views further comprises at least one view representing a scenario view adapted to receive input from the user and schematically display interactions between distributed objects for performing an application process.

8. A mechanism, according to claim 1, wherein the means for defining different parameters of the application and the distributed system comprise a graphical user interface having a plurality of views of the application and the distributed system, at least one view representing a topology view adapted to receive input and display representations of a plurality of hosts and networks between the hosts in the distributed system.

9. A mechanism, according to claim 7, wherein the plurality of views further comprises at least one view representing a topology view adapted to receive input and display representations of a plurality of hosts and networks between the hosts in the distributed system.

10. A mechanism, according to claim 9, wherein the plurality of views further comprises at least one view representing a workload view adapted to receive input and display arrival rates for the application process.

11. A method, implemented in a computer, for determining a performance-based distribution of application processes over a distributed system having a plurality of linked processors and including middleware connections between distributed processors, the method comprising the steps of:

i) selecting parameters defining
      a) hosts, networks and connections in the distributed system,
      b) interactions between the hosts for executing at least one application process; and
      c) storing said selected parameters as a plurality of separate views including a partition, scenario, topology and workload views;

ii) executing a simulation of said at least one application process according to the selected parameters in said partition, scenario, topology and workload views; and iii) providing a performance analysis of the simulation based upon said views.

12. A method, according to claim 11, further comprising the steps of:

receiving input to define alternate parameters for at least one of the hosts, networks, connections or interactions between hosts; and saving said alternate parameters as separate data objects.

13. A method, according to claim 12, wherein the step of selecting parameters comprises selecting parameters from the saved data objects.

14. A method, according to claim 11, further comprising the step of repeating steps ii) and iii) for alternate selections of parameters.

15. A method, according to claim 12, wherein the step of receiving input to define alternate parameters comprises receiving input to define at least:

a partition view having partitions, objects within the partitions, associations between the objects and middleware defaults;

a scenario view having interactions between the objects and resource demands on the distributed system;

a topology view having hosts, networks, connections between the hosts and the networks, and processes on the hosts; and a workload view having values for arrival rates for external events.

16. A method, according to claim 15, wherein the workload view is defined as further comprising required response time for external service requests.

17. A method, according to claim 15, wherein the step of receiving input to define alternate parameters comprises receiving input to define at least one alternate of one of said views.

18. A computer program product having a computer readable medium for use with a graphic display device in a computer, said computer program product comprising:

computer readable program code means embodied in said medium for providing performance projections for designs of an application over a distributed system, said computer program product having:

computer readable code means for causing a computer to define different parameters of the application and the distributed system as a plurality of views including a partition, scenario, topology and workload views in response to user input through the graphics display device;

computer readable code means for causing the computer to separately store the defined parameters as persistent objects for each of said views;

computer readable code means for modifying the stored persistent objects within each of said views in response to user input through the graphics display device; and computer readable code means for causing the computer to provide analyses of groupings of the stored persistent objects, as selected by user input, said groupings defining different performance scenarios based upon each of said views.

19. A computer program product, according to claim 18, wherein the computer readable program code means for causing the computer to provide analyses also causes the computer to:

select a set of parameters defining a distributed system from the stored persistent objects;

simulate an application process over the set of parameters; and provide performance results of the simulation.

20. A program storage device readable by a machine, tangibly embodying a program of instructions executable by the machine to perform method steps for determining a performance-based distribution of application processes over a distributed system having a plurality of linked processors and including middleware connections between distributed processors, said method steps comprising:

i) selecting parameters defining
   a) hosts, networks and connections in the distributed system,
   b) interactions between the hosts for executing at least one application process; and
   c) storing said selected parameters as a plurality of separate views including a partition, scenario, topology and workload views;

ii) executing a simulation of said at least one application process according to the selected parameters in said partition, scenario, topology and workload views; and iii) providing a performance analysis of the simulation based upon said views.

21. A program storage device readable by a machine, tangibly embodying a program of instructions executable by the machine to perform method steps for determining a performance-based distribution of application processes over a distributed system having a plurality of linked processors and including middleware connections between distributed processors, said method steps comprising:

i) receiving input to define alternate parameters to define:

a partition view having partitions, objects within the partitions, associations between the objects and middleware defaults;

a scenario view having interactions between the objects and resource demands on the distributed system;

a topology view having hosts, networks, connections between the hosts and the networks, and processes on the hosts; and a workload view having values for arrival rates for external events.

ii) saving said alternate parameters as separate data objects;

iii) executing a simulation of said at least one application process according to the selected parameters; and iv) providing a performance analysis of the simulation.

* * * * *